United States Patent [19]
Field et al.

[11] Patent Number: 5,829,094
[45] Date of Patent: Nov. 3, 1998

[54] SWEEPER WITH ELECTROMAGNETIC FILTER CLEANING

[75] Inventors: Bruce F. Field, Golden Valley; Laurence A. Jensen, Oakdale; Charles W. Bricher, St. Paul, all of Minn.

[73] Assignee: Tennant Company, Minneapolis, Minn.

[21] Appl. No.: 802,372

[22] Filed: Feb. 19, 1997

[51] Int. Cl.$^6$ ............................. A47L 9/20; B01D 46/04
[52] U.S. Cl. ............................. 15/352; 55/300; 55/304
[58] Field of Search ............................. 15/352; 55/300, 55/304, 299

[56] References Cited

U.S. PATENT DOCUMENTS

| | | |
|---|---|---|
| 3,326,383 | 6/1967 | Pranovi . |
| 3,504,480 | 4/1970 | Copcutt et al. . |
| 3,543,483 | 12/1970 | Sheehan . |
| 3,545,178 | 12/1970 | Sheehan . |
| 3,938,971 | 2/1976 | McClure ............................. 55/300 X |
| 4,048,693 | 9/1977 | Axelrod et al. ............................. 55/300 X |
| 4,099,940 | 7/1978 | Mortensen et al. . |
| 4,258,451 | 3/1981 | Sommerfeld . |
| 4,345,353 | 8/1982 | Sommerfeld . |
| 5,013,333 | 5/1991 | Beaufoy et al. . |
| 5,194,077 | 3/1993 | Bargiel et al. . |

*Primary Examiner*—Chris K. Moore
*Attorney, Agent, or Firm*—Dorn, McEachran, Jambor & Keating

[57] ABSTRACT

A sweeping machine has a housing, wheels for moving the housing, a sweeping brush mounted on the housing, a hopper positioned adjacent the brush to receive dust and debris therefrom, a dust collection chamber on the housing, and a vacuum fan mounted on the housing and creating an air flow path from the brush through the hopper and to the dust collection chamber. There is a filter element in the air flow path, with the filter element including a plurality of generally parallel pleats having folds extending in a direction transverse to the air flow path. There is a pleat moving element extending generally transverse to the pleats and engaged with the pleats. An electric actuator is mounted on top of the pleats and a bar is associated with the actuator and movable upon actuation thereof. There is a spring connected between the pleat moving element and the filter frame. The application of pulsed electric power to the actuator with the electromagnetic field caused thereby moving the pleat moving element and the pleats associated therewith in a first direction, with the spring moving the pleat moving element and the pleats associated therewith in a second direction, with movement in said first and second directions imparting a shaking, cleaning movement to the pleats.

28 Claims, 3 Drawing Sheets

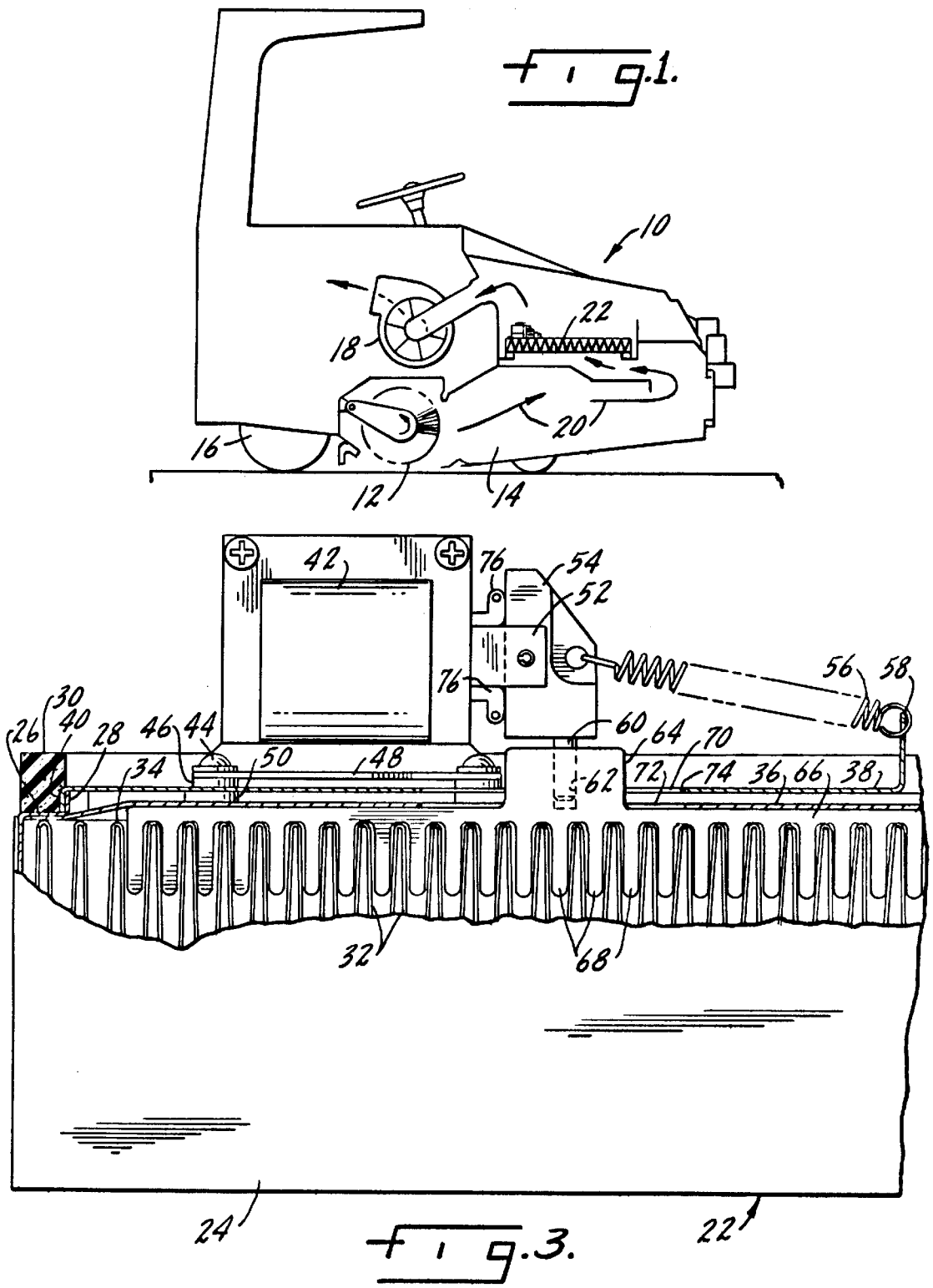

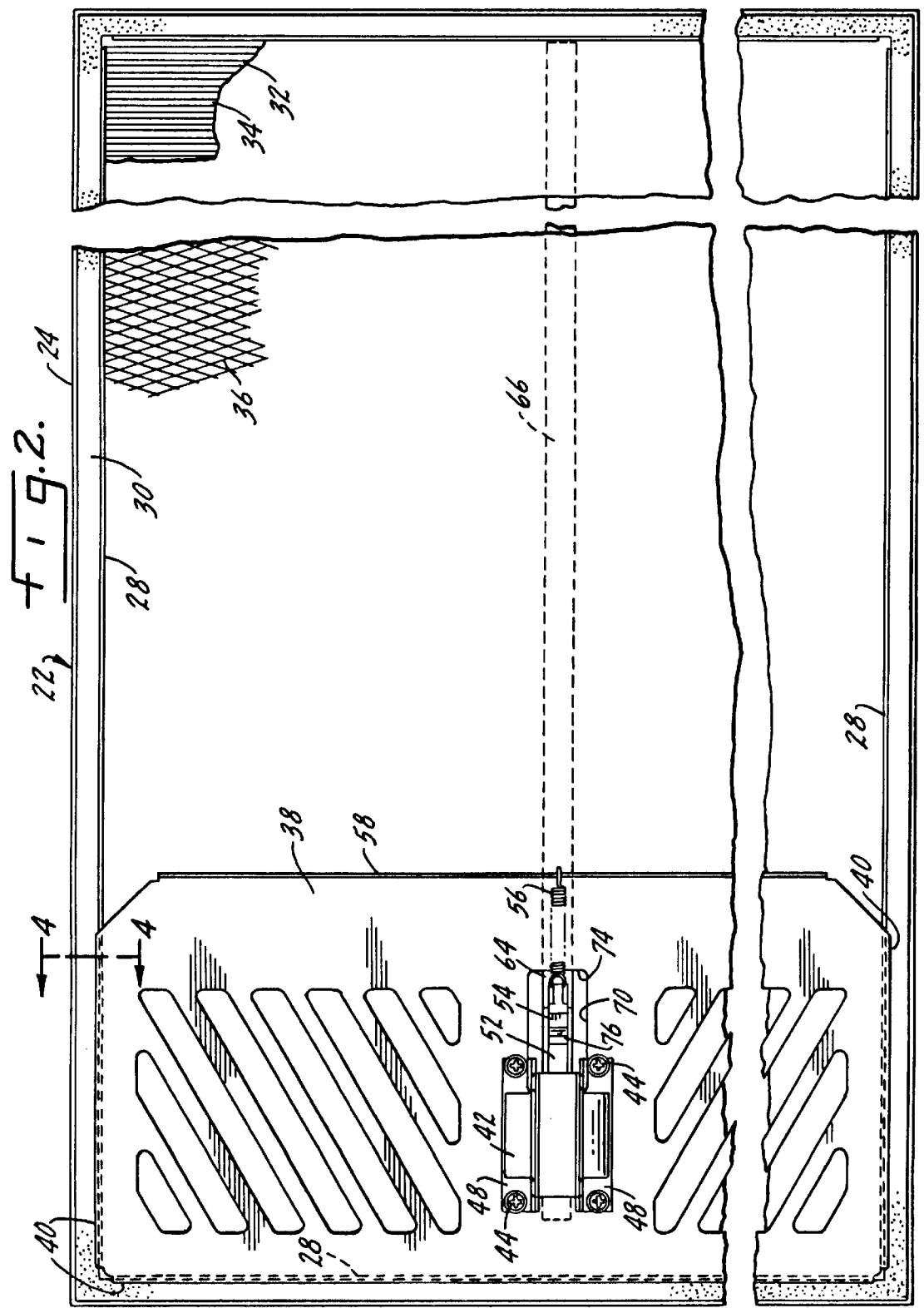

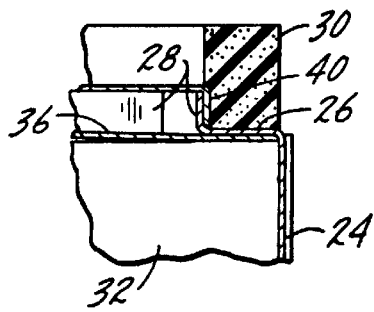
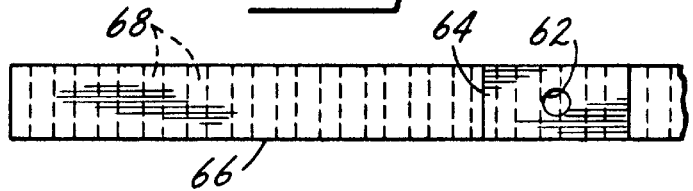
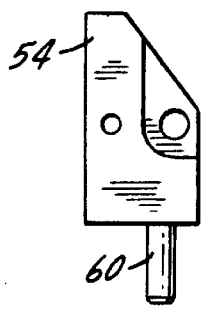
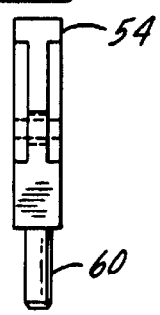

SWEEPER WITH ELECTROMAGNETIC FILTER CLEANING

THE FIELD OF THE INVENTION

The present invention relates to sweeping machines of the type shown generally in U.S. Pat. No. 4,787,923 owned by Tennant Company of Minneapolis, Minn., the assignee of the present application. More particularly, the present invention relates to an improved filter and the means for cleaning the filter.

It is present practice in the sweeping machine art, as shown in the above-mentioned '923 patent, to place a filter in the air flow path of the sweeping machine in such a position that dust is collected below the filter and clean air passes from the filter to the vacuum fan. Such filters are periodically cleaned, again as shown in the '923 patent, by shaker bars. Shaker bars are not particularly effective as a cleaning device and the filter panel is often cleaned inefficiently and inadequately. The present invention provides electromagnetic shaking of the filter medium by placement of a small solenoid on the top of the filter medium and then the use of a longitudinally extending bar to cause movement of the filter medium. When power is applied to the solenoid, the bar will move in one direction with a spring returning the bar in the opposite direction. The solenoid is pulsed so that the vibration imparted to the bar, and thus to the filter pleats, very effectively cleans the filter through shaking, causing the dust to fall down into the dust collection chamber. The electromagnetic filter cleaning of the present invention is essentially noiseless, simple in construction, and uses relatively low vibration of the filter medium. The entire filter panel may be cleaned, or the panel may be cleaned in segments.

In the disclosed embodiment, a longitudinally extending pleat moving element in the form of a comb is positioned above the uppermost folds of the parallel pleats. The comb has a projection which extends through the top of the filter frame and is connected to the movable plunger of a solenoid. There is a spring return for the pleat moving element. When the solenoid is pulsed, the pleat moving element or bar will move in one direction, and when the electric power is removed, the spring will return the bar in the opposite direction. The resultant reciprocal movement of the pleats will result in a substantial shaking or vibration of the pleats which will remove the dust which is caked and embedded therein.

The time duration of the application of pulsed power can be controlled, as can the frequency of pulsed power, as well as the intervals between the application of pulsed power.

The invention will be described using a solenoid as the actuator for moving the pleats. It is also possible to use an air actuator, a hydraulic actuator or other form of electric actuator such as a motor driven screw.

SUMMARY OF THE INVENTION

This is a continuation-in-part of co-pending application Ser. No. 08/623,698 filed Apr. 15, 1996.

The present invention relates to sweeping machines and in particular to an electromagnetic filter cleaning device for sweeping machines.

A primary purpose of the invention is a filter cleaning device for the use described which utilizes a pulsed solenoid positioned above a pleated filter, with the filter pleats being associated with a longitudinally extending bar, with the bar being moved by the application of pulsed power to the solenoid.

Another purpose is a filter cleaning system as described in which the time duration and frequency of solenoid operation is controlled to maximize filter cleaning.

Another purpose is a simply constructed, reliable electromagnetic cleaning system in which a single actuator, through the medium of a longitudinally extending comb associated with the pleats, is capable of imparting a shaking movement to the pleats.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic illustration of a sweeper of the type using the cleaning system disclosed herein;

FIG. 2 is a top plan view, with portions broken away, of the filter element illustrating the electromagnetic shaker device applied thereto;

FIG. 3 is a side view, in part section, illustrating the filter and the solenoid attached thereto;

FIG. 4 is a section along plane 4—4 of FIG. 2;

FIG. 5 is a top view of a portion of the pleat moving element;

FIG. 6 is a side view of the post connecting the transformer and the pleat moving element;

FIG. 7 is a front view of the post of FIG. 6;

FIG. 8 is a top view of the post of FIGS. 6 and 7; and

FIG. 9 is an electrical schematic of the control system for the shaker device illustrated herein.

DESCRIPTION OF THE PREFERRED EMBODIMENT

In FIG. 1, a typical street sweeper of the type illustrated in U.S. Pat. No. 4,787,923, owned by Tennant Company of Minneapolis, Minn., the assignee of the present application, is indicated at 10. The sweeper 10 has a brush 12 which directs dust and debris into a hopper 14. Wheels 16 support the sweeper 10. There is a vacuum fan 18 which creates an air flow path in the direction of arrows 20. Positioned within the air flow path is a filter 22 which is illustrated in detail in drawing FIGS. 2–8.

The filter 22 includes a peripheral frame 24 having an inwardly extending shoulder 26, shown in FIG. 3, which shoulder has an upwardly-extending peripheral rib 28. A peripheral foam seal 30 seats on top of the shoulder 26.

Positioned within the confines of the frame 22 is a pleated filter 32 having a plurality of adjacent upper folds 34 and a plurality of lower folds, which are not illustrated herein, but will be obvious from the disclosure of FIG. 3. The filter pleats 32 extend in a direction transverse to the path of air flow through the filter and may be conventional and formed of paper, synthetic materials or otherwise, as the particular use dictates. On top of the filter pleats 32 is a mesh cover 36 which is formed of an expanded material, as particularly shown in FIG. 2, and may, for example, be constructed of aluminum, plastic or other suitable materials.

As shown in FIGS. 2 and 3, mounted on top of the mesh cover 36 is a plate 38 which on three sides has a downwardly extending flange 40 extending over the upwardly-extending rib 28 of the peripheral frame. Thus, the plate 38 is supported by the frame on three sides. The plate 38 preferably is located adjacent one end of the filter frame, although it could be otherwise.

Mounted on top of the plate 38 is solenoid 42, with the solenoid being attached to the top of the plate 38 by means of fasteners 44 and spacers 46. Mounting straps 48 are located between the fasteners 44 and the spacers, with the fasteners being threaded into further spacers 50 positioned between the lower surface of plate 38 and the upper surface of cover 36.

The solenoid 42 has an outwardly-extending plunger 52 which is movable when the solenoid is activated by electric power and mounts a post 54 at its outward end. The post 54 mounts one end of a coil spring 56, with the other end of the spring 56 being mounted to an upturned flange 58 of the plate 38. Thus, the spring 56 will move the plunger 52 to the right, as pictured in FIG. 2, and the application of pulsed power will move the plunger 52 to the left, as shown in FIG. 3.

The post 54 has a downwardly-extending rod 60, which extends into a bore 62 of an upwardly-extending projection 64 formed as a part of a plate moving member or comb 66. The comb 66 extends longitudinally directly beneath the cover 36 and has a plurality of uniformly aligned, downwardly-extending teeth 68 which extend between adjacent upper folds 34 of the pleated filter element 32. In the preferred form the comb may be attached to the filter element by a suitable adhesive. Thus, movement of the comb 66 will move the pleats. The projection 64 extends upwardly through aligned gaps 70 and 72 in the plate 38 and cover 36, respectively. The edge 74 of plate 38 forms a right-hand stop for movement of the comb 66, permitting approximately ½" of movement in that direction. A pair of stops 76 are part of the plunger 52 and limit left direction movement of the post and plunger. The extreme of left direction movement, caused by actuation of the solenoid 42 is shown in FIG. 3, and the extreme of rightward movement or spring movement of the comb 66 is shown in FIG. 2.

In normal operation, activation of the plunger, as described hereinafter, will move the plunger 52, the post 54 and the comb 66 to the left. Stop 76 will limit this movement to approximately ½". Upon removal of the electric power from the solenoid 42, the spring 56 will draw the post back, with attendant movement of the comb 66 to the right to the point where the projection 64 contacts the edge 74 of plate 38, providing a stop for right direction movement of the filter shaking comb.

The circuit controlling the application of power to the solenoid 42 is illustrated in FIG. 9. An amplifier 80 is connected to the coil of solenoid 42, with the amplifier being connected to an intensity generator 82, which in turn is connected to a time duration clock 84. A remote filter shake button 86 initiates operation and causes the clock 84 to send a series of signals to the intensity generator 82. The remote intensity control 88 for the intensity generator determines the amplitude or voltage level of pulses applied from generator 82 to the amplifier which in turn determines the level of power to the solenoid. Clock 84, as indicated, provides an output which is a series of pulses, with the clock controlling the period of the pulse and the time between successive pulses. The output from the intensity generator is a series of pulses, at a frequency and intensity determined by the operator by the remote intensity control 88. The intensity or the amplitude of the pulses will control the electromagnetic field created by the solenoid. The result of the circuit shown is to provide pulses at a desired frequency and a desired amplitude and with a predetermined duration between pulses to the amplifier, which will be activated as described.

For a typical sweeper mechanical shaker, the so-called shake-back time or the time that the filter is vibrated to move dust, is from 30 to 45 seconds. With the electromagnetic shaker disclosed herein, complete cleaning of the filter can take place in as little as six seconds. The frequency of power application to the solenoid may be 30 hz and the cleaning cycle for an efficient mode of operation is to have the solenoid on for 30 percent of the time and off for 70 percent of the time. The invention should not be limited to these specific parameters, although such have proven to be highly effective in use.

Whereas the preferred form of the invention has been shown and described herein, it should be realized that there may be many modifications, substitutions and alterations thereto.

The embodiments of the invention in which an exclusive property or privilege is claimed are defined as follows:

1. A sweeping machine including a housing, wheels for moving the housing, a sweeping brush mounted on the housing, a hopper positioned adjacent the brush to receive dust and debris therefrom, a dust collection chamber on the housing, a vacuum fan mounted on the housing and creating an air flow path from the brush through the hopper and to the dust collection chamber, a filter element in said air flow path, said filter element including a plurality of generally parallel pleats having folds extending in a direction transverse to the air flow path, a pleat moving element extending generally transverse to said pleats and having means thereon for engaging said pleats, an actuator, a mounting element for said actuator positioned adjacent said pleats, a bar associated with said actuator and movable upon actuation thereof, said bar being connected to said pleat moving element, yielding means connected between said bar and said mounting element, and means for applying pulsed power to said actuator, thereby moving said bar and said pleat moving element and the pleats associated therewith in a first direction, with said yielding means moving said bar and said pleat moving element and the pleats associated therewith in a second direction upon termination of the pulsed power to said actuator, whereby said pleat moving element imparts a shaking, cleaning movement to said pleats.

2. The sweeping machine of claim 1 wherein said pleat moving element is in the form of a comb, with an upper longitudinally extending member and a plurality of downwardly extending teeth.

3. The sweeping machine of claim 2 wherein there is a downwardly extending tooth positioned between pairs of adjacent pleats.

4. The sweeping machine of claim 1 wherein said yielding means includes a spring attached at one end to said mounting element and at the other end to said bar.

5. The sweeping machine of claim 4 wherein said spring is a coil spring.

6. The sweeping machine of claim 1 wherein said mounting element includes a gap, a portion of said pleat moving element extending upwardly through said gap, and a post connected between said plate moving element portion and said bar.

7. The sweeping machine of claim 6 wherein said yielding means includes a spring connected between said post and said mounting element.

8. The sweeping machine of claim 1 including stops limiting movement of said bar in said first and said second directions.

9. The sweeping machine of claim 8 wherein one of said stops is formed on said mounting element, with the other stop including said actuator.

10. The sweeping machine of claim 1 including a cover overlying said pleats and positioned in part between said pleats and said mounting element, said pleat moving element being positioned on the opposite side of said cover from said actuator.

11. The sweeping machine of claim 10 wherein said cover is formed of an expanded material having a plurality of adjacent openings.

12. The sweeping machine of claim 1 wherein said actuator is a solenoid.

13. The sweeping machine of claim 12 wherein the means for applying pulsed power include electric circuit means limiting the application of pulsed electric power to said solenoid for a predetermined period of time.

14. The sweeping machine of claim 13 wherein said means for applying pulsed electric power include means for varying the intensity of the applied power.

15. The sweeping machine of claim 14 wherein the means for applying pulsed electric power include means for varying the frequency of the applied power.

16. A pleated air filter and means for cleaning it, said filter including a frame, a plurality of generally parallel pleats mounted in said frame, said pleats each having spaced parallel upper and lower folds, an elongated pleat moving element associated with said pleat upper folds, an electric coil mounted on said frame above the pleat upper folds, means for applying pulsed electric power to said coil to create an electromagnetic field thereby, which pulsed electromagnetic field causes reciprocal movement of said pleat moving element in a first direction transverse to said generally parallel pleats, a spring connected to said pleat moving element and said frame for moving said pleat moving element in a second direction transverse to said generally parallel pleats, whereby movement in said first and second directions imparts a shaking, cleaning movement to said pleats.

17. The filter of claim 16 wherein said pleat moving element is in the form of a comb, with an upper longitudinally extending member and a plurality of downwardly extending teeth.

18. The filter of claim 17 wherein there is a downwardly extending tooth positioned between pairs of adjacent pleats.

19. The filter of claim 16 wherein said spring is a coil spring.

20. The filter of claim 16 including a mounting element for said coil, said mounting element including a gap, a portion of said pleat moving element extending upwardly through said gap, a bar movable by said coil, and a post connected between said plate moving element portion and said bar.

21. The filter of claim 20 wherein said spring is connected between said post and said mounting element.

22. The filter of claim 16 including stops limiting movement of said bar in said first and said second directions.

23. The filter of claim 22 wherein one of said stops is formed on said mounting element, with the other stop including said electric coil.

24. The filter of claim 16 including a cover overlying said pleats and positioned in part between said pleats and said mounting element, said pleat moving element being positioned on the opposite side of said cover from said electric coil.

25. The filter of claim 24 wherein said cover is formed of an expanded material having a plurality of adjacent openings.

26. The filter of claim 16 wherein the means for applying pulsed electric power include circuit means limiting the application of pulsed electric power to said coil for a predetermined period of time.

27. The filter of claim 26 wherein said means for applying pulsed electric power include means for varying the intensity of the applied power.

28. The filter of claim 27 wherein the means for applying pulsed electric power include means for varying the frequency of the applied power.

* * * * *